United States Patent
Zhang

(10) Patent No.: US 11,163,519 B2
(45) Date of Patent: Nov. 2, 2021

(54) MULTIPURPOSE BLUETOOTH INTERFACE AND CONTROLLER

(71) Applicant: Deming Zhang, Beijing (CN)

(72) Inventor: Deming Zhang, Beijing (CN)

( * ) Notice: Subject to any disclaimer, the term of this patent is extended or adjusted under 35 U.S.C. 154(b) by 0 days.

(21) Appl. No.: 16/633,152

(22) PCT Filed: Aug. 22, 2017

(86) PCT No.: PCT/CN2017/098377
§ 371 (c)(1),
(2) Date: Jan. 22, 2020

(87) PCT Pub. No.: WO2019/024138
PCT Pub. Date: Feb. 7, 2019

(65) Prior Publication Data
US 2020/0201593 A1 Jun. 25, 2020

(30) Foreign Application Priority Data

Jul. 30, 2017 (CN) .......................... 201710635119.X

(51) Int. Cl.
*G06F 3/16* (2006.01)
*H04W 4/80* (2018.01)
(Continued)

(52) U.S. Cl.
CPC .............. *G06F 3/162* (2013.01); *G06F 3/165* (2013.01); *G10L 25/51* (2013.01); *H04R 1/08* (2013.01);
(Continued)

(58) Field of Classification Search
None
See application file for complete search history.

(56) References Cited

U.S. PATENT DOCUMENTS

2008/0057857 A1   3/2008   Smith
2014/0069261 A1*  3/2014   Tsai .................. G10H 1/361
                                              84/610

FOREIGN PATENT DOCUMENTS

CN    105338194 A    2/2016
CN    106028183 A    10/2016
(Continued)

OTHER PUBLICATIONS

Machine Translation of KR 101124459B1, 6 pages (Year: 2012).*
(Continued)

*Primary Examiner* — Ping Lee
(74) *Attorney, Agent, or Firm* — JCIP Global Inc.

(57) ABSTRACT

A multi-purpose Bluetooth interface and controller includes a microcontrol unit and at least one first microphone, the first microphone being electrically connected to the MCU and configured to collect sound signals and convert the sound signals into electrical signals that are received by the MCU; wherein the Bluetooth interface and controller further includes at least one connection port which is electrically connected to the MCU and is configured to connect an external device that includes a wired microphone, the wired microphone also being configured to collect sound signals that are received by the MCU; and the MCU encodes electrical sound signals received from the first microphone and the external wired microphone, and transmits the encoded sound signals in uplink to a mobile terminal via a Bluetooth wireless connection established between the MCU and the mobile terminal for subsequent processing by the mobile terminal.

13 Claims, 1 Drawing Sheet

(51) Int. Cl.
　　　*H04W 76/10*　　　(2018.01)
　　　*G10L 25/51*　　　(2013.01)
　　　*H04R 1/08*　　　(2006.01)
　　　*H04R 1/10*　　　(2006.01)
　　　*H04R 3/00*　　　(2006.01)

(52) U.S. Cl.
　　　CPC ............. *H04R 1/1041* (2013.01); *H04R 3/00* (2013.01); *H04W 4/80* (2018.02); *H04W 76/10* (2018.02); *H04R 2420/07* (2013.01); *H04R 2420/09* (2013.01)

(56) References Cited

FOREIGN PATENT DOCUMENTS

| | | |
|---|---|---|
| CN | 106028208 A | 10/2016 |
| CN | 106792313 A | 5/2017 |
| CN | 106993242 A | 7/2017 |
| KR | 101124459 | 3/2012 |
| KR | 101124459 B1 * | 3/2012 |

OTHER PUBLICATIONS

Machine Translation of CN106028208A, 4 pages (Year: 2016).*
"Search Report of Europe Counterpart Application", dated Jun. 15, 2020, p. 1-p. 8.

* cited by examiner

MULTIPURPOSE BLUETOOTH INTERFACE AND CONTROLLER

CROSS REFERENCE TO THE RELATED APPLICATIONS

This application is the national phase entry of International Application No. PCT/CN2017/098377, filed on Aug. 22, 2017, which is based upon and claims priority to Chinese Patent Application No. 201710635119.X, filed on Jul. 30, 2017, the entire contents of which are incorporated herein by reference.

TECHNICAL FIELD

The present invention relates to the audio field, and in particular to a multi-purpose Bluetooth interface and controller.

BACKGROUND

At present, Bluetooth audio transmission technology has become the mainstream technology of wireless audio transmission. Corresponding portable audio products have also been widely used. Representative products including Bluetooth wireless headsets, Bluetooth wireless sounders, etc., may be conveniently connected to mobile terminals such as mobile phones and tablet computers, and their intelligence is getting higher and higher. However, the existing technology focuses more on downlink transmission from the mobile terminals to the Bluetooth audio products, that is, using a Bluetooth connection to play back a sound, but focuses less on the quality of uplink transmission from the Bluetooth audio products to the mobile terminals, which brings many inconveniences to users' practical applications, for example, these products are often incompetent in occasions where high-quality voice recordings or voice communications are required. Recently, some Bluetooth microphone products have appeared on the market. Although there has been a great improvement in audio transmission quality, the scalability and flexibility of the products are not strong enough, and there is room for further improvement.

SUMMARY

In order to overcome the defects in the prior art, the present invention proposes a multi-purpose Bluetooth interface and controller, in addition to its own sound collection capability, the multi-purpose Bluetooth interface and controller can further connect a wired microphone through a wired interface, and make it possible to work with a microphone of a mobile terminal by virtue of a high-quality multi-channel Bluetooth audio uplink transmission method, greatly expanding the sound collection function, thereby providing more flexibility.

A multi-purpose Bluetooth interface and controller is proposed, comprising a microcontrol unit (MCU) and at least one first microphone, the first microphone being electrically connected to the MCU and configured to collect sound signals and convert the sound signals into electrical signals that are received by the MCU; wherein the Bluetooth interface and controller further comprises at least one connection port which is electrically connected to the MCU and is configured to connect an external device that comprises a wired microphone, the wired microphone also being configured to collect sound signals that are received by the MCU; and the MCU encodes electrical sound signals received from the first microphone and an external wired microphone, and sends the encoded sound signals in uplink to a mobile terminal via a Bluetooth wireless connection established between the MCU and the mobile terminal for subsequent processing by the mobile terminal.

The Bluetooth interface and controller further comprises a user control unit configured to receive user instructions so as to control the MCU to perform selection on the sound signals from the first microphone and the wired microphone, and then send them in uplink.

The mobile terminal has a built-in application used with the Bluetooth interface and controller.

The application is used to enable the mobile terminal to simultaneously obtain sound signals from the multi-purpose Bluetooth interface and controller and a second microphone of the mobile terminal for subsequent processing by the mobile terminal.

In further embodiments, the multi-purpose Bluetooth interface and controller further comprises at least one speaker, which is electrically connected to the MCU, wherein the MCU receives sound signals transmitted from the mobile terminal via the Bluetooth connection in downlink, then decodes the sound signals and sends them to the speaker for playback.

The connection port can be further connected to a headset or a headset microphone, and a user can monitor a microphone signal or listen to the sound signal from the mobile terminal through the headset or the headset microphone. When it is the headset microphone that is connected, a third microphone of the headset microphone can be used for sound collection simultaneously.

The MCU can mix uplink and downlink sound signals and then send them to the headset or headset microphone connected to the connection port for playback. The MCU can further perform sound effect processing on the uplink or downlink sound signals.

The connection port can be further used for charging and data transmission.

The mobile terminal comprises a mobile phone, a tablet computer, a laptop computer, or a personal digital assistant (PDA).

DETAILED DESCRIPTION OF THE EMBODIMENTS

Figure 1:
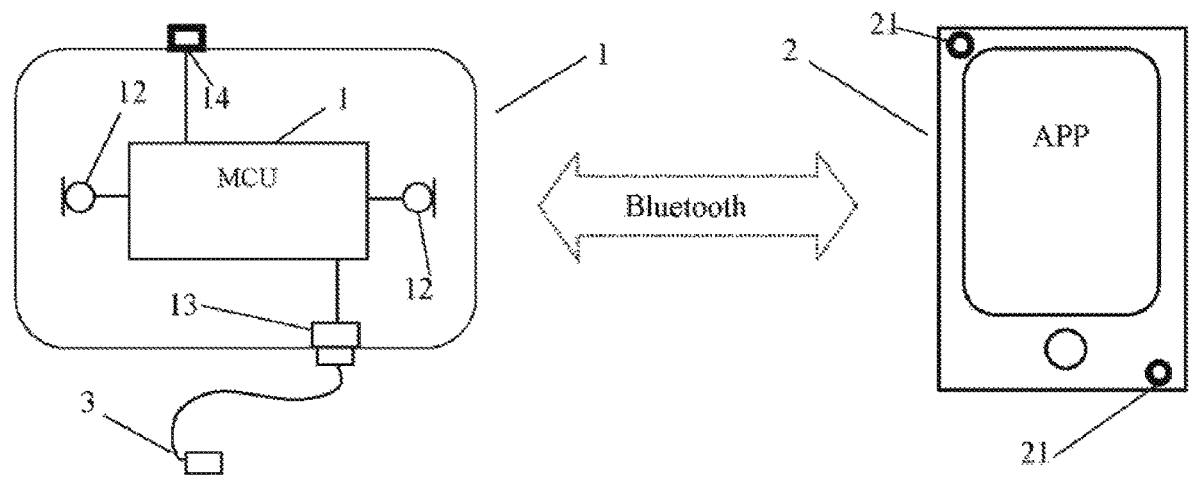
FIG. 1 is a structural diagram and a working principle diagram of a main embodiment of a multi-purpose Bluetooth interface and controller according to the present invention.

The multi-purpose Bluetooth interface and controller of the present invention will be described in detail in combination with the drawings. As shown in FIG. 1, the multi-purpose Bluetooth interface and controller 1 comprises a microcontrol unit (hereinafter referred to as MCU) 11 and at least one microphone 12, the microphone 12 being electrically connected to the MCU 11 and configured to collect sound signals and convert the sound signals into electrical signals that are received by the MCU 11. Further, the Bluetooth interface and controller 1 further comprises at least one connection port 13 which is electrically connected to the MCU 11 and is configured to connect an external device. A typical external device comprises a wired microphone 3 which is also configured to collect sound signals that are received by the MCU 11. The MCU 11 encodes electrical sound signals received from the microphone 12 and the external microphone 3, and sends the encoded sound signal in uplink to a mobile terminal 2 via a Bluetooth wireless connection established between the MCU 11 and the mobile terminal 2 for subsequent processing by the mobile terminal 2, wherein the mobile terminal 2 has a built-in application used with the Bluetooth interface and controller 1. The Bluetooth interface and controller 1 further comprises a user control unit 14, which may be, for example, a button, a touch screen, or the like, and is configured to receive user instructions. For example, a user may control, by means of the user control unit 14, the MCU 11 to perform selection on sound signals from the microphone 12 and the microphone 3 and then send them in uplink, for example, selecting one, two, or multiple channels of signals for uplink transmission. This selection can also be implemented by the application on the mobile terminal 2. The user can use the application to control MCU 11 to select a sound channel, and then perform transmission. Of course, another situation may be that the MCU 11 sends all channels of sound signals in uplink, while the user uses the application on the mobile terminal 2 to select the sound signals at a receiving end.

When using the multi-purpose Bluetooth interface and controller 1, the user may only use the microphone 12 of the Bluetooth interface and controller 1 for general sound collection, such as global sound field collection, while for some special occasions, such as during a news interview, a wired microphone 3 may be connected to the connection port 13, so that the Bluetooth interface and controller 1 may be used to collect the user's voice, while the connected wired microphone 3 is used to collect the interviewee's voice. Further, the MCU 11 of the Bluetooth interface and controller 1 may be used to send the two channels of signals to the mobile terminal 2 together by using a Bluetooth connection. The mobile terminal 2 makes recording or performs other audio signal processing. As mentioned above, the user may also use the user control unit 14 or the application on the mobile terminal 2 to select a sound channel. In this way, the usability and flexibility of sound collection are greatly improved.

Considering that the mobile terminal 2 also has at least one microphone 21, which may also be used for sound collection, it is further possible to use the mobile terminal 2 to simultaneously obtain sound signals from the multi-purpose Bluetooth interface and controller 1 and the built-in microphone 21, which may be realized through the application supporting the Bluetooth interface and controller 1. In a specific embodiment, using an application to obtain signals from a microphone 21 built in a mobile terminal 2 is an existing technology for those skilled in the art, which will not be repeated. In this way, in fact, the sound collection capability of the Bluetooth interface and controller 1 is further extended. While the Bluetooth interface and controller 1 is used, the microphone 21 built in the mobile terminal 2 may be also used for sound collection, for example, in an occasion where multi-channel sound collection is required, the microphone 12 built in the Bluetooth interface and controller 1 and the external wired microphone 3 may be used to collect sounds in different channels, and at the same time, the microphone 21 built in the mobile terminal 2 may be used to collect sounds in other channels. The mobile terminal 2 performs subsequent processing on these sounds at the same time, so that more channels and more flexible configuration of sound collection can be realized.

Figure 2:
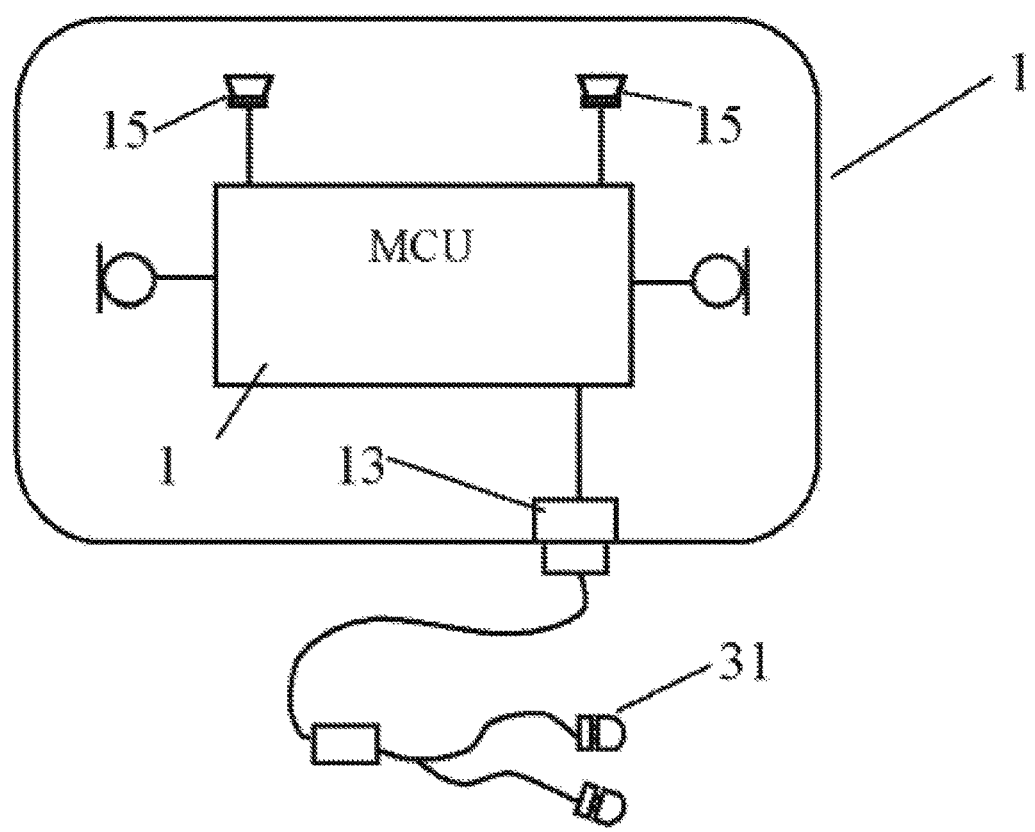
FIG. 2 is a structural diagram of an improved embodiment of the multi-purpose Bluetooth interface and controller according to the present invention.

As an improvement to the above embodiment, as shown in FIG. 2, the multi-purpose Bluetooth interface and controller 1 further comprises at least one speaker 15, which is electrically connected to the MCU 11, wherein the MCU 11 receives sound signals transmitted from the mobile terminal 2 via the Bluetooth connection in downlink, then decodes the sound signals and sends them to the speaker 15 for playback; Further, the connection port 13 may be connected to a headset or a headset microphone (hereinafter referred to as an earphone mic) 31, and a user may monitor a microphone signal or listen to the sound signal from the mobile terminal 2 through the headset. When it is the earphone mic that is connected, in addition to the above monitoring or listening, as in the case of the external microphone described above, the microphone of the earphone mic may also be used for sound collection at the same time.

However, in a specific embodiment, the MCU 11 of the present invention may be implemented using a CSR platform, for example, using 8675/8670 chips to achieve microphone signal acquisition, encoding, and Bluetooth reception/transmission. Among them, uplink transmission is performed using a RFCOMM channel, and the encoding and decoding method is full-band coding, including but not limited to SBC, OPUS, Apt-X, and AAC. For downlink reception, it can be performed using either the RFCOMM channel or a transmission method commonly used in the art, such as A2DP. Of course, it is not limited to the above specific implementations, other methods known to those skilled in the art that can carry out uplink/downlink multi-channel Bluetooth audio transmission can also be used for implementation. The connection port 13 includes, but is not limited to, a 3.5 mm audio interface, a digital Lightning interface, a USB interface, or the like. In addition to being plugged in by a headset or an earphone mic, these interfaces may be further connected to a power source so as to charge the multi-purpose Bluetooth interface and controller 1 or perform data transmission, and the specific implementations are all existing technologies, which will not be repeated. In addition, the subsequent processing of the mobile terminal 2 includes, but is not limited to, recording of a sound signal, sound effect processing, transmission over a connected external network, and the like. In addition to sending sound signals in downlink, receiving sound signals in uplink, encoding and decoding sound signals, and having a monitoring circuit that allows monitoring by means of an inserted headset or earphone mic, the MCU 11 may also mix the uplink and downlink sound signals and then send them to the headset or earphone mic 31 of the connection port 13 for playback. For example, in the case of karaoke singing, the MCU 11 further has a sound effect processing function, which can perform filtering, delay, gain and other effects processing on the uplink or downlink sound signals. The mobile terminal 2 includes, but is not limited to, a mobile phone, a tablet computer, a laptop computer, a PDA, or other devices with a Bluetooth audio function.

Those skilled in the art should understand that reasonable improvements in the content disclosed in the present invention should also belong to the protection scope of the present invention.

What is claimed is:

1. A multi-purpose Bluetooth interface and controller, comprising:
   a microcontrol unit (MCU), and
   at least one first microphone;
   wherein
   the at least one first microphone is electrically connected to the MCU and configured to collect first sound signals and convert the first sound signals into electrical signals, wherein the electrical signals are received by the MCU; the multi-purpose Bluetooth interface and controller further comprises at least one connection port, wherein the at least one connection port is electrically connected to the MCU and is configured to connect an external device; the external device comprises a wired microphone; the wired microphone is configured to collect the first sound signals, the at least one first microphone and the wired microphone are configured to collect the first sound signals simultaneously in different channels, and the first sound signals collected from the at least one first microphone and the wired microphone are received by the MCU; and the MCU encodes electrical sound signals received from the at least one first microphone and the wired microphone to obtain encoded sound signals, and transmits the encoded sound signals in uplink to a mobile terminal via a Bluetooth wireless connection for first subsequent processing by the mobile terminal, wherein the Bluetooth wireless connection is established between the MCU and the mobile terminal, wherein, the multi-purpose Bluetooth interface and controller further comprises a user control unit, and the user control unit is configured to receive user instructions to control the MCU to perform a selection on the electrical sound signals from the at least one first microphone and the wired microphone and select the electrical sound signals only from the wired microphone, and send the selected electrical sound signals in the uplink;

wherein, the mobile terminal has a built-in application used with the multi-purpose Bluetooth interface and controller; and the built-in application is configured to allow the mobile terminal to simultaneously obtain second sound signals from the multi-purpose Bluetooth interface and controller and third sound signals from a second microphone of the mobile terminal for second subsequent processing by the mobile terminal.

2. The multi-purpose Bluetooth interface and controller of claim 1, wherein, the multi-purpose Bluetooth interface and controller further comprises at least one speaker; the at least one speaker is electrically connected to the MCU; the MCU receives second sound signals transmitted from the mobile terminal via the Bluetooth wireless connection in downlink, and decodes the second sound signals and sends the second sound signals to the at least one speaker for a playback.

3. The multi-purpose Bluetooth interface and controller of claim 2, wherein, the at least one connection port is further connected to a headset and a third microphone, and wherein the headset allows a user listening to the second sound signals received from the mobile terminal through the headset.

4. The multi-purpose Bluetooth interface and controller of claim 3, wherein the third microphone is configured to perform a sound collection simultaneously with the at least one first microphone.

5. The multi-purpose Bluetooth interface and controller of claim 3, wherein, the MCU mixes uplink sound signals and downlink sound signals and send a signal comprising the uplink sound signals and the downlink sound signals to the headset connected to the at least one connection port for the playback.

6. The multi-purpose Bluetooth interface and controller of claim 3, wherein, the MCU further performs sound effect processing on uplink sound signals or downlink sound signals.

7. The multi-purpose Bluetooth interface and controller of claim 6, wherein, the sound effect processing comprises filtering, delay, and a gain.

8. The multi-purpose Bluetooth interface and controller of claim 1, wherein, the at least one connection port comprises a 3.5 mm audio interface, a digital Lightning interface, or a USB interface.

9. The multi-purpose Bluetooth interface and controller of claim 8, wherein, the at least one connection port is further configured to charge and perform a data transmission.

10. The multi-purpose Bluetooth interface and controller of claim 1, wherein, the mobile terminal comprises a mobile phone, a tablet computer, a laptop computer, a PDA, or other devices with a Bluetooth audio function.

11. The multi-purpose Bluetooth interface and controller of claim 1, wherein, the multi-purpose Bluetooth interface and controller further comprises at least one speaker; the at least one speaker is electrically connected to the MCU; the MCU receives second sound signals transmitted from the mobile terminal via the Bluetooth wireless connection in downlink, and decodes the second sound signals and sends the second sound signals to the at least one speaker for a playback.

12. The multi-purpose Bluetooth interface and controller of claim 11, wherein, the at least one connection port is further connected to a headset and a third microphone, and a user listens to the second sound signals from the mobile terminal through the headset.

13. The multi-purpose Bluetooth interface and controller of claim 11, wherein, the at least one connection port is further connected to a headset and a third microphone, and a user listens to the second sound signals from the mobile terminal through the headset.

* * * * *